April 25, 1939.  O. M. ANDERSON ET AL  2,155,852
ELECTRIC TOASTER
Filed Feb. 20, 1936  4 Sheets-Sheet 1

Inventor
OSCAR M. ANDERSON
NILS T. ALMQUIST
By N. Clay Lindsey
Attorney

April 25, 1939. O. M. ANDERSON ET AL 2,155,852
ELECTRIC TOASTER
Filed Feb. 20, 1936 4 Sheets-Sheet 2

Inventor
OSCAR M. ANDERSON
NILS T. ALMQUIST

Attorney

April 25, 1939.　　O. M. ANDERSON ET AL　　2,155,852
ELECTRIC TOASTER
Filed Feb. 20, 1936　　4 Sheets-Sheet 3

Inventor
OSCAR M. ANDERSON
NILS T. ALMQUIST
By W. Clay Lindsey.
Attorney

April 25, 1939.   O. M. ANDERSON ET AL   2,155,852
ELECTRIC TOASTER
Filed Feb. 20, 1936   4 Sheets-Sheet 4

Inventor
OSCAR M. ANDERSON
NILS T. ALMQUIST
By N. Clay Lindsey
Attorney

Patented Apr. 25, 1939

2,155,852

UNITED STATES PATENT OFFICE 2,155,852

ELECTRIC TOASTER

Oscar M. Anderson and Nils T. Almquist, New Britain, Conn., assignors to Landers, Frary & Clark, New Britain, Conn., a corporation of Connecticut Application February 20, 1936, Serial No. 64,852

8 Claims. (Cl. 161—16)

This invention relates to electric bread toasters and, more particularly, to a toaster arranged to automatically remove a slice of bread from a heating zone after a predetermined but adjustable toasting period.

It is, therefore, the primary object of this invention to provide a toaster arranged to automatically toast successive slices of bread to the same extent.

It is a further object of this invention to provide a bread toaster arranged to automatically remove a slice of bread to a discharge position at the termination of an automatic but adjustable toasting period.

A further object of our invention is to provide a simply constructed and efficient mechanical timing device for a bread toaster which may be preadjusted to control the toasting time for successive slices of bread to the same extent.

To the accomplishment of these objects and others which will be apparent from the following description of our invention, we have provided an electrically heated bread toaster having a mechanically actuated escapement mechanism which may be preadjusted to eject successive slices of bread from the toasting zone after the completion of a predetermined but adjustable heating period. Our invention further resides in the features of construction, combination of elements, and arrangement of parts which will be exemplified in the construction hereinafter disclosed and the scope of the application which will be indicated in the appended claims.

In the accompanying drawings illustrating this invention, wherein like parts are indicated by like numerals:

Figure 1:
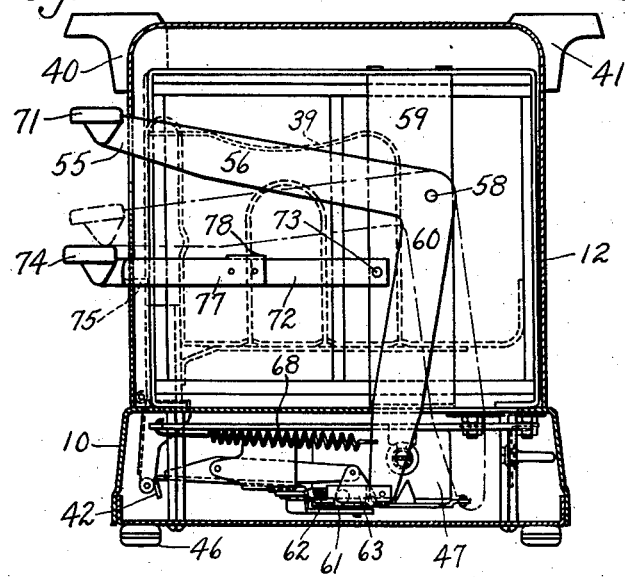
Figure 1 is a vertical section through the toaster, showing the adjustable timing mechanism associated therewith.

As illustrated, one embodiment of our invention comprises a toaster having a casing provided with a base 10, side walls 12, and a front wall 13 interrupted by a vertical aperture 14 in which a suitably shaped door 15 is movably mounted. The casing is also provided with spaced top walls 16 having an elongated aperture therebetween and in alignment with aperture 14 so that heat may be dissipated and slices of bread may be conveniently moved therethrough by means of door 15 and an associated bread supporting rack. The casing may be formed to any desired shape and composed of any material capable of withstanding heat. In the present illustrated embodiment, the various parts are composed of sheet metal suitably secured together, as by rivets, to provide a substantially rectangular casing having any suitable decorative form and finish to provide a pleasing appearance.

In the present showing, our toaster is arranged to simultaneously and automatically toast two slices of bread to the same extent. However, it is to be understood that the present invention relates to a toaster arranged to control the toasting time of one or any number of slices of bread. As illustrated, we have provided an intermediate inner vertical partition 20 having a heating element 21 supported therein and composed of suitably perforated heat resistant insulating material having heater wires 22 threaded therein so that a heating element is formed which simultaneously emits substantially the same heat from each side thereof. Similar heating elements are located within the casing and adjacent to the opposed side walls thereof so that each slice of bread is simultaneously toasted between opposed spaced heating elements. It is not deemed necessary to further describe these heating elements since they may be of any well-known and standard construction.

Each heating element is insulated from the casing and electrically connected to spaced terminal bars 25 and 26 supported by and insulated from base 10 and which in turn are electrically connected to suitable spaced pins 28 and 29 rigidly secured to but insulated from the base and arranged to be removably connected to an electrical socket. In the present instance, the pins 28 and 29 are rigidly secured to a depending portion 30 of terminal 26. One of said pins is electrically connected thereto, and the other is insulated therefrom. The pins are preferably positioned within the base 10, and a suitable aperture 31 is provided in the side of the base adjacent thereto and adapted to receive a socket whereby it may be electrically connected with said pins. Hence, it will be appreciated that whenever an electrical socket connected to a cord carrying a suitable source of electrical energy is connected to the pins 28 and 29, all three heating elements are simultaneously energized and arranged to continuously emit heat until the socket is disconnected.

Figure 3:
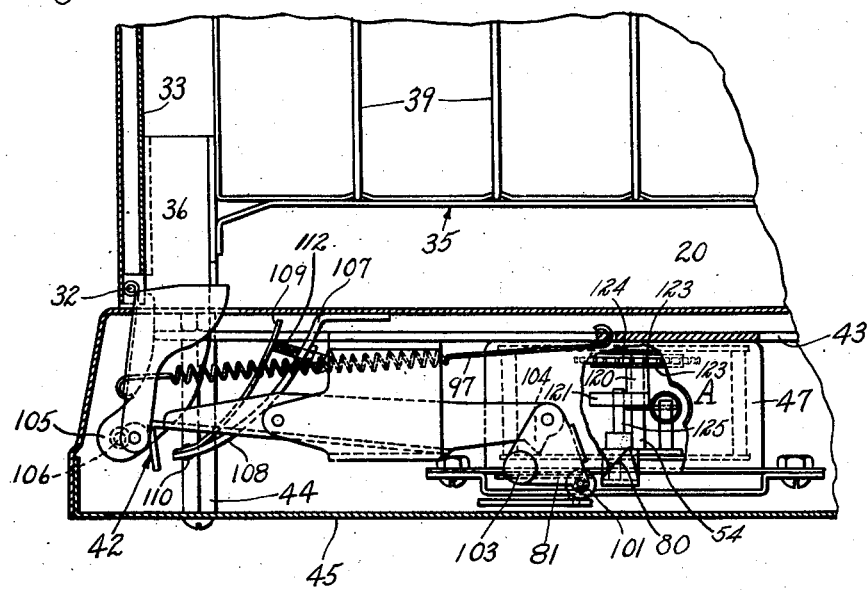
Fig. 3 is an enlarged fragmentary sectional view of the release mechanism and its associated parts when the bread rack is in an operative toasting position.
Figure 4:
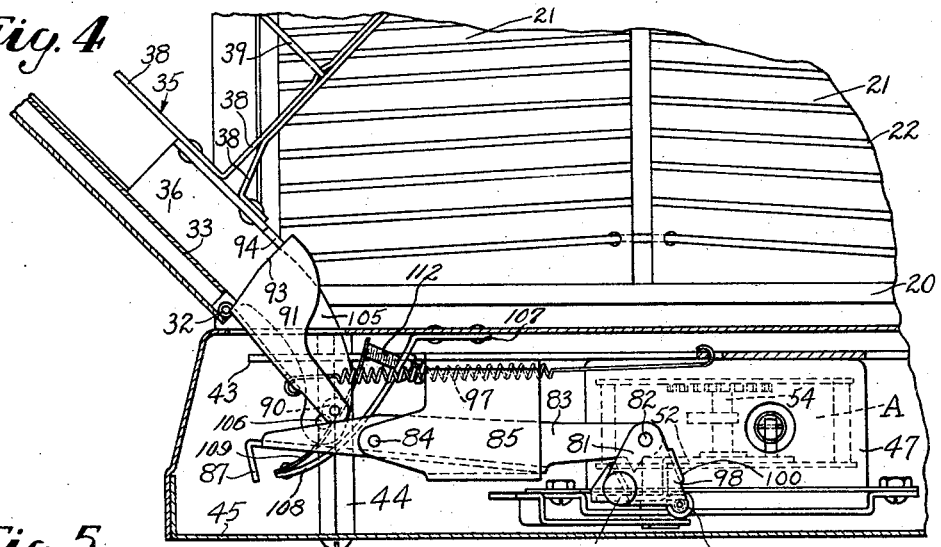
Fig. 4 shows the relative position of the parts illustrated in Fig. 3 when the door latch has been released and the bread rack is rocked out of toasting position.

The door 15 is pivotally supported at its lower end upon a transverse pin 32 supported in the spaced portions of front wall 13 adjacent to base 10 so that it may be pivotally swung from the operative position shown in Fig. 3 to the inoperative position shown in Fig. 4. The door 15 is further provided with a spaced inner wall 33 integrally secured thereto and arranged to support two spaced racks, generally indicated at 35, of such shape that they may each suitably support a slice of bread.

In the present instance, both racks 35 are supported by an angle bracket 36 secured to wall 33. These racks may be of any suitable form and, as herein illustrated, are composed of angle members 38 secured to wall 33 and bracket 36 by rivets, and upwardly extending wire guards 39 secured to said members serve to laterally position a slice of bread. The outer face of door 15 is provided with a suitable handle 40 whereby the door may be rocked to either of its respective positions as shown in Figs. 3 and 4, and a slice of bread within the rack 35 may be easily moved with the door into and out of toasting position, as desired. As shown in Fig. 1, a similar handle 41 is suitably fastened on the opposed side wall 12 whereby said handles may provide a convenient means for moving the toaster. The toasting rack and door are preferably so constructed that the door may be easily swung upon its pivot pin 32 at any time and will remain to either its open or closed position, as desired. Hence, it will be apparent that the toaster may be manually operated at any time without employing the automatic timing mechanism associated therewith which will be later described.

Our automatic timing mechanism, in general, comprises a suitable escapement mechanism A and associated mechanical means whereby the escapement mechanism may be preadjusted to release a spring pressed latch, generally indicated at 42, and arranged to automatically swing the door 15 and racks 35 to the position shown in Fig. 4, thereby automatically moving the bread at the completion of the toasting period away from the heating zone to a position where it is easily accessible. The escapement mechanism A may be of any suitable and well-known type. Hence, it is not believed necessary to disclose it here in detail, and it has been illustrated more or less diagrammatically.

As herein illustrated, we have provided a supporting plate 43 rigidly secured in spaced relation to base 10 in any suitable manner, as by studs 44 which are adapted to receive screws, whereby a base cover 45 may be removably secured in position. Feet 46 may be located on the under side of cover 45 in any desired position to support the toaster. For convenience of construction and in order to provide an easy access to the control mechanism in case of adjustment or repair, the various parts of our timing device are mounted on plate 43 whereby substantially the entire mechanism and the plate may be removed as a unit from within the base. The escapement device A includes a casing 47 arranged to support a mechanical escapement of any well-known clock type and, as herein illustrated, having a tensioned spring 48 secured at one end to a fixed depending portion 49 of plate 43 and at the other end to a stud 50 mounted in a short laterally protruding arm 51 of a lever 52 actuated by the escapement mechanism and which is journalled for free arcuate movement on a shaft 54 journalled in said casing and restrained to swing at a predetermined uniformly slow rate in response to the tension of spring 48 under control of the escapement mechanism. The outer end of the lever 52 is provided with a cam portion arranged to engage a pivotal release link and disengage latch 42 whereby a spring actuated device serves to tilt door 15 to the position illustrated in Fig. 4, as will be later described.

Lever 52 is arranged to be swung through a varying but adjustable arcuate distance in order to regulate a desired but predetermined extent of toasting time. To accomplish this, we provide a bell crank lever 55 having a laterally projecting arm 56 arranged for vertical movement within a slot 57 in front wall 13. The bell crank lever is pivotally supported upon a horizontal pin 58 mounted on an upright member 59 suitably secured within the casing and, in the present instance, fastened to the frame which supports one of the heater elements. Bell crank lever 55 is further provided with a downwardly depending arm 60 substantially beneath pin 58 and pivotally connected at its lower end to an adjustable link, generally indicated at 61, and preferably composed of a screw threaded member 62 adjustably threaded within a member 63 pivotally secured to arm 60. Member 62 is pivotally connected by means of a screw or other suitable means to one end of a horizontally movable lever 64 which is rigidly fastened at its other end to vertical shaft 65 journalled in casing 47. The shaft 65 has a lever 66 rigidly fastened at its upper end for integral angular movement therewith in casing 47 and arranged to engage a depending pin 67 on escapement lever 52 and intermediate of its ends.

Figure 9:
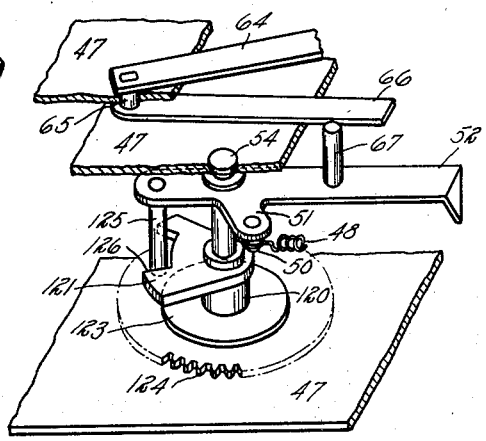
Fig. 9 is an enlarged fragmentary perspective view taken substantially along the lines 9—9 of Fig. 5 and illustrating the lost motion connection between the escapement lever and its operating mechanism.

The setting of lever 52 is so arranged that it may be swung to an initial starting position without transmitting any movement to the escapement mechanism. As illustrated in Figs. 3 and 9, the shaft 54 has a sleeve 120 journalled thereon. This sleeve has an arcuate sector 121 secured to one end thereof and a pair of spaced clutch plates 123 fastened to the other end. A gear 124 connected with the escapement mechanism is journalled on the sleeve and frictionally but slidably engaged between the clutch plates. A pin 125 projecting from the inner end of lever 52 extending through an arcuate slot 126 in sector 121 selectively engages the ends of said slot. Hence, it will be appreciated that the setting movement of lever 52 will engage pin 125 with one end of slot 126 and transmit rotation to members 121 and 120 causing a slippage of clutch plates 123 on gear 124 without rotating said gear during the presetting of lever 52. During the escapement movement of lever 52, pin 125 engages the other end of slot 126 (Fig. 9), and the frictional engagement of plates 123 and gear 124 is sufficient to operate the escapement mechanism which is constructed to be driven by rotation of gear 124 in this direction. The purpose of the lost motion connection of pin 125 within slot 126 will be later described.

Figure 5:
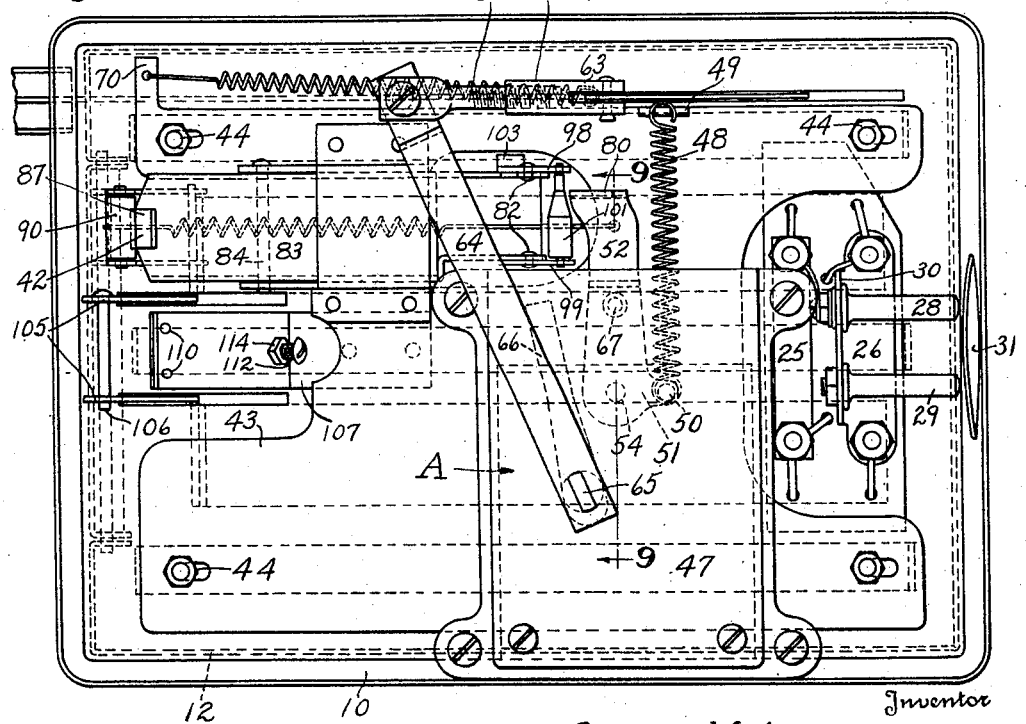
Fig. 5 is a plan view looking at the under side of the base of our toaster with the bottom cover plate removed.

A coiled spring 68 is mounted under resilient tension between the lower end of arm 60 and a lateral extension 70 of plate 43 so that bell crank 55 will be normally maintained in its upper position at the top of slot 57, as illustrated in full lines in Fig. 1. To facilitate convenient movement of the bell crank lever, a heat resistant handle 71 is mounted on the outer end of arm 56. It will thus be noted that downward movement of the bell crank lever, as caused by manually pressing upon handle 71, serves to act through link 61 to swing lever 64 towards the right, as viewed in Fig. 5, and move lever 66 into engagement with depending pin 67, causing escapement lever 52 to also swing towards the right, presetting the spring actuated escapement mechanism associated therewith.

Figure 2:
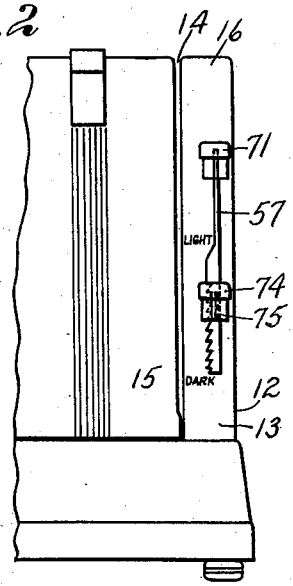
Fig. 2 is a fragmentary end view of our invention showing the control member to regulate the extent of toasting period.

In view of the fact that lever 52 is restrained by the escapement mechanism to move uniformly towards the left under influence of spring 48, it will be appreciated that the extent of presetting movement imparted to lever 52 will predetermine the extent and period of escapement movement of said lever with relation to its delayed operation upon latch 42 which serves to release the door 15 so that the bread will be automatically swung out of the heating zone, as will be hereinafter described. To control the extent of movement imparted to bell crank lever 55 so that lever 52 may be swung through a predetermined distance to provide an adjustable period of escapement, an angularly movable arm 72 is pivotally secured at its inner end upon a pin 73 mounted upon upright 59, and the outer end of said arm laterally extends through the lower portion of slot 57 and is arranged for operation therein beneath arm 56 by means of a suitable insulated handle 74. The outer end of arm 72 adjacent to handle 74 is provided with a laterally extending locking tooth 75 adapted to be selectively engaged within any one of a plurality of spaced teeth 76 cut within the side of slot 57, as shown in Fig. 2. A spring pressed member 77 is suitably secured, as by rivets, to an intermediate portion of arm 72 and provided with an outer end adjacent to the toothed portion 75 which resiliently engages the side of slot 57 opposed to teeth 76 to urge tooth 75 into locked engagement with one of teeth 76 and normally prevent the movement of arm 72 from its selectively locked position.

Intermediate of the ends of arm 72, we have further provided a laterally projecting ear 78 which, in the present instance, is integrally formed with member 77 and is adapted to be engaged by the under side of arm 56 to limit the extent of its downward movement as determined by the selective position of arm 72. As a matter of convenience, a series of spaced graduations are provided adjacent to the teeth 76 and marked with the legends "light" and "dark" at the respective upper and lower ends thereof. Hence, it will be apparent that arm 72 may be preset relative to said graduations, and the downward movement of the manually operated bell crank lever 55 will be limited to a predetermined extent so that lever 52 will be preset as required, and latch 42 will be released at a predetermined time after the start of a toasting operation, thereby providing a simple and convenient means whereby successive slices of bread may be toasted to the same degree. In the event that the adjustable movement of arm 72 does not provide the desired range of heating time, link 61 may be lengthened or shortened as required.

The operative movement of lever 52 and its cam portion 80 towards the left actuates a downwardly depending release link 81 freely pivotal on coaxial pins 82 journalled in the rearward end of a latch lever 83 pivotally supported intermediate of its ends upon a transverse pin 84 journalled in a bracket 85 rigidly fastened to plate 43. The front end of lever 83 forms part of the latch 42 and is provided with a depending tongue 87 arranged to engage a roller 90 journalled in the lower end of a depending lever 91 pivotally mounted upon pin 32 which supports door 15. Lever 91 has spaced upper faces 93 urged into engagement with a depending portion 94 of bracket 36 by means of a coiled spring 97 secured under resilient tension between the lower end of lever 91 and plate 43, as illustrated in Figs. 3 and 4. It will thus be apparent that when tongue 87 abuts against roller 90 of latch 42, the upward pivotal movement of lever 91 about pin 32, as normally caused by spring 97, is prevented. However, it will be noted that when latch 42 is released, the spring 97 causes lever 91 to quickly swing upwardly, and surface 93 engages depending portion 94, causing the door 15 and associated racks 35 to swing into the position shown in Figs. 4 and 8 wherein the toast is substantially out of the heating zone and is easily accessible. Whereas we preferably mount link 81 on the end of lever 83 in a position to be operated by cam 80, it will be apparent that the same result could be equally well obtained by mounting the cam on lever 83 and pivotally securing the link to the end of lever 52, and it is believed that the scope of the present disclosure is of sufficient breadth to cover such a construction.

Figure 6:
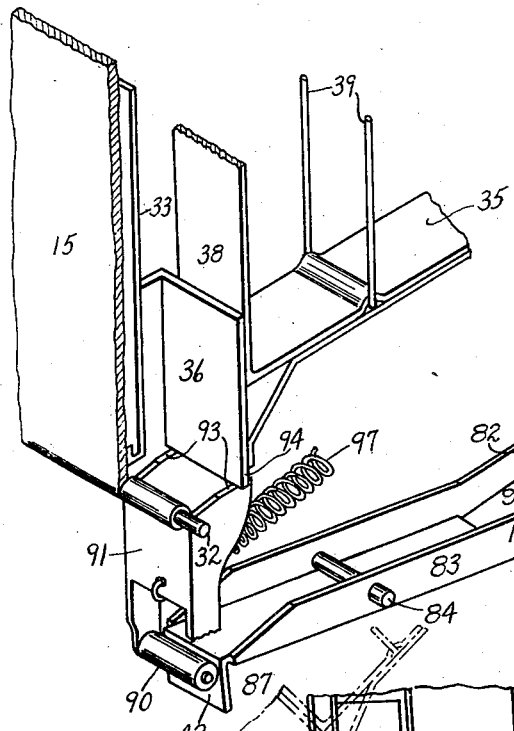
Fig. 6 is a fragmentary perspective view illustrating the latch release mechanism and associated parts.
Figure 7:
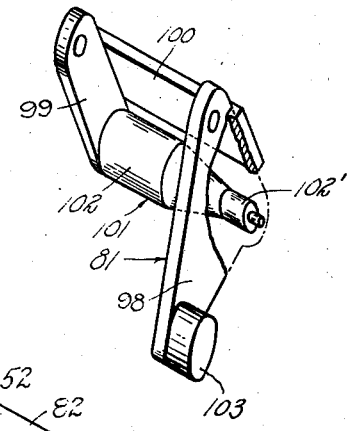
Fig. 7 is a perspective enlarged view of the release link.

Lever 83 is preferably so supported by the intermediate pivot pin 84 that the rearward end of said lever supporting pivotal link 81 is heavier than the latch end of the lever whereby the action of gravity will tend to normally maintain latch 42 in engaged position and resist the tensioned pressure of spring 97. Depending link 81 is provided with the opposed side plates 98 and 99 interconnected by a cross bar 100. These plates are journalled at their upper ends on the pins 82, and a cam engaging roller 101 is rotatably supported therein at their lower ends. A counter weight 103 fastened to plate 98 serves to normally maintain link 81 in the position shown in Figs. 3 and 6 wherein roller 101 lies in the path of movement of cam 80, and a depending portion 104 on the rearward end of lever 83 lies in the path of movement of cross bar 100. Hence, as lever 52 swings towards the left during its operative movement, cam 80 first engages roller 101 and pivotally swings link 81 about pins 82 until bar 100 engages the depending portion 104. Further movement of lever 52 serves to pivot lever 83 about pin 84 and release latch 42 since at this time portion 104 prevents further pivotal movement of link 81.

Figure 8:
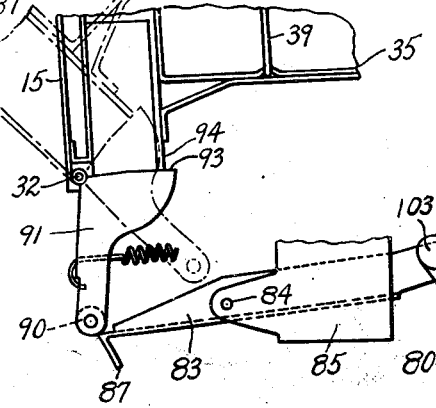
Fig. 8 is a fragmentary view showing the locations of the various parts at time of release.

Roller 101 is preferably provided with an enlarged diameter 102 and a reduced diameter 102' connected by an intermediate tapering portion. As shown in Figs. 8 and 4, cam 80 first swings into operative engagement with roller 101 and lifts the roller until the high point of the cam engages the enlarged diameter 102 to rock lever 83 and release latch 42. During this cam actuated release, it wil' be noted that the cam 80 is swung beyond roller 101 to a final position (Fig. 4) in which the link 81 and roller 101 are again free to swing downwardly to their normal positions. In other words, to assure a complete release of latch 42, a greater movement is imparted to the escapement lever 52 and cam 80 than is normally required for release of said latch.

Upon resetting of the timing mechanism to its initial operative position as caused by the downward shifting of lever 55, cam 80, which is preferably shaped as an inverted V, will not transmit any movement to a lever 83 since link 81 is free to swing upwardly in a direction away from the rearward end of lever 83. At this time, roller 101 will simply be lifted by the cam without affecting other mechanism. During this lifting movement of link 81, the cam will engage roller 101, and as the roller is lifted by the cam, the arcuate movement of arm 52 will cause the cam to slidably move down the inclined taper of the roller into engagement with the reduced diameter 102', thus permitting the link 81 to become disengaged from the cam and swing downwardly to its normal position sooner than would be the case if roller 101 were of the same enlarged diameter throughout its entire length. Furthermore, the lost motion connection between pin 125 and the ends of slot 126 is provided in the event that a very short toasting period is desired. It will be noted that this lost motion permits an additional extent of presetting movement of lever 52 which serves to move cam 80 beyond link 81 so that the link is free to drop to operative position. Upon completion of this presetting movement, the spring 48 causes immediate take up of the lost motion, and operative movement of lever 52 from this position is regulated by the escapement mechanism.

In view of the fact that spring 97 is permitted to suddenly exert all of its compressive energy and throw the door and racks 35 to an open position, we have further provided a suitable shock absorber so that the door will be eased to a stop during its final opening movement. To accomplish this, bracket 36 is provided with a pair of spaced downwardly depending ears 105 integral therewith and having an interconnecting transverse pin 106 at the lower ends thereof. A bracket 107 rigidly fastened to the top portion of base 10 and depending therefrom is provided with a laterally extending arm 108 having a resilient spring strip 109 secured thereto at the lower end, as by rivets 110. The upper end of arm 108 is provided with an adjustment stud 112 threadably received therein and engageable with the upper end of spring 109 to control the extent of its deformation and its position relative to pin 106. Stud 112 may be rigidly locked in its adjusted position by means of a suitable locking nut 114. As shown in Fig. 4, when door 15 is quickly thrown to its open position by means of spring 97 when latch 42 is suddenly disengaged, pin 106 frictionally engages spring 109 and serves to further deform said spring which cushions the final movement of the door and prevents its stopping with a sudden shock. This cushioned movement may be adjusted to the desired extent by means of stud 112.

In the operation of our device, lever 72 is located at the desired point as indicated by the graduations associated therewith. Door 15 is then opened, and one or two slices of bread, as the case may require, are inserted within the racks 35. Door 15 is then rocked to its closed position, locating the bread within the toasting zones and engaging latch 42. Lever 55 is then depressed until its further movement is limited by the position of lever 72, and the automatic toasting period is started. During the automatic toasting period, cam 80 swings towards the left and, after a predetermined time, engages roller 101, thereby pivotally moving lever 83 and releasing latch 42 whereupon spring 97 serves to pivotally open door 15 and move the toast out of the toasting zone to a position where it may be easily removed.

Figure 11:
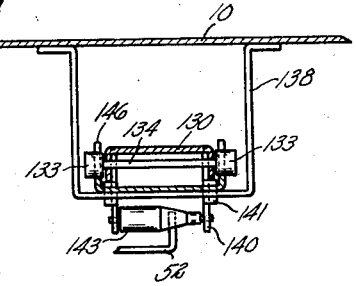
Fig. 11 is a sectional view taken along lines 11—11 of Fig. 10.
Figure 10:
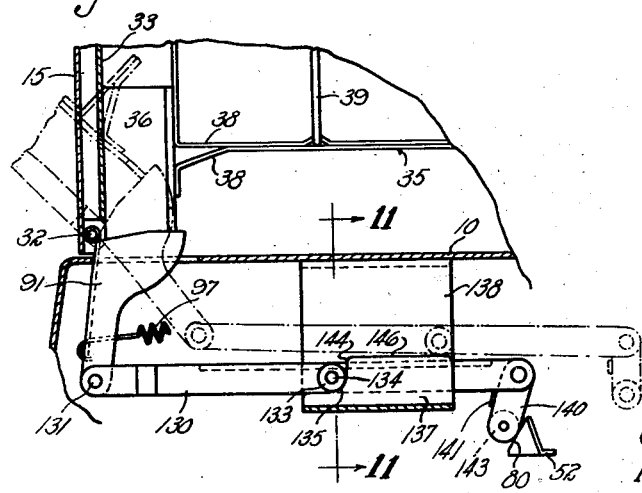
Fig. 10 shows another embodiment of the latch release mechanism and its associated parts.

A slightly different embodiment of our invention is illustrated in Figs. 10 and 11. As herein shown, the toaster is of the same general construction as that previously described with the exception that a different type of release latch mechanism is provided. Depending lever 91 has a substantially horizontally disposed lever 130 pivotally secured thereto at one end by a pin 131. Lever 130 is supported intermediate of its ends upon a pair of rollers 133 journalled on a transverse pin 134 passing through the lever 130 and removably secured in seats 135 within the upwardly extending arms of a yoke member 137 which is supported by a bracket 138 suitably secured within base 10. The free end of lever 130 has a depending link 140 pivotally secured thereto and provided with a cross bar 141 engageable with the under side of lever 130 and limiting the extent of pivotal link movement. A roller 143 of the same general form of roller 101 is journalled within the lower portion of link 140 and positioned for engagement with cam 80 at the outer end of lever 52. As shown in Fig. 10, each seat 135 is provided with a substantially vertical abutment 144 against which the rollers 133 are urged under influence of spring 97, thereby normally restraining the stored energy within said spring and maintaining depending lever 91 in the full line position illustrated.

In the operation of this release mechanism, the door 15 is closed, moving the various parts to the full line positions of Fig. 10 wherein rollers 133 will rest in seats 135 against abutments 144. Lever 52 and cam 80 are then preset as described with reference to our previous embodiment. During this presetting operation, the free pivotal movement of link 140 will permit the cam to pass by it without transmitting movement to lever 130. The cam 80 engages roller 143 in the course of its operative movement, causing bar 141 to engage lever 130 and lift rollers 133 above abutments 144 onto surfaces 146 upon which the rollers are free to move. As soon as the rollers are released from the abutments, spring 97 moves the parts to the dot and dash positions illustrated, quickly opening door 15 and moving the toast to a position out of the heating zone.

In view of the fact that many changes could be made in the above construction and many apparently widely different embodiments of this invention could be made without departing from the scope thereof, it is intended that all matter contained in the above description or shown in the accompanying drawings shall be interpreted only as illustrative and not in a limiting sense.

It is also to be understood that the language used in the following claims is intended to cover all of the generic and specific features of this invention as herein described and all statements of the scope of the invention which, as a matter of language, might be said to fall therebetween.

We claim as our invention:

1. In a toaster having a movable bread carrier, a mechanical time control mechanism comprising a depending pivotally supported lever engageable with said carrier to shift it to a non-operative position outside of the heating zone, a spring tending to cause said lever movement, a substantially horizontal lever journalled intermediate of its ends upon a transverse pin, said lever being normally gravity actuated to lock one end thereof against the depending lever to prevent said spring actuated movement, a clock mechanism having an escapement controlled angularly movable arm terminating in a cam, a depending link pivotally secured to an end of the horizontal lever and having a roller journalled therein in the path of said cam, and means limiting the extent of pivotal link movement whereby operative engagement of the cam and roller will serve to tilt the horizontal lever and cause the carrier to quickly move out of the toasting zone.

2. In an automatic timing device for an electric toaster, a movable bread carrier, a spring actuated door opening mechanism arranged to move the bread carrier out of the toasting zone, a horizontally pivotal lever having a detent at one end, said lever being gravity urged into position whereby the detent prevents said spring actuated movement, a depending member pivotally secured to the opposite end of the lever, a roller supported by said member, and a clock actuated mechanism arranged to engage said roller after a predetermined period and upset the normal position of said lever whereby the detent will be disengaged and the spring actuated mechanism will serve to move the bread carrier out of the toasting zone.

3. In an automatic timing device for an electric toaster, a pivotally mounted door having a bread carrier secured thereto, a door opening mechanism arranged to move the bread carrier out of the toasting zone, said mechanism including a horizontally pivoted release lever, a link pivoted at one end thereof and gravity urged to a depending position, a roller journalled at the lower end of said link and having a reduced diameter and an enlarged diameter interconnected by a tapering portion, means on the release lever engageable with the depending link and limiting its rocking movement towards said lever, and a swinging arm having a cam at its outer end arranged to engage and swing to either side of the roller, said forward cam movement engaging the enlarged diameter of the roller to swing the depending lever into engagement with the release lever and operate the door opening mechanism and said rearward cam movement engaging the reduced diameter of the roller whereby the cam will quickly move past the roller and the link will again swing downwardly to an operative position.

4. In an automatic timing device for an electric toaster, a pivotally mounted door having a bread carrier thereon, a spring actuated door opening mechanism arranged to open the door and move the bread carrier out of the toasting zone, a substantially horizontal lever having a detent at one end arranged to lock with said mechanism and prevent the spring actuated movement, said lever being gravity urged into locked position, a depending link pivotally secured to the other end of said lever, a roller at the lower end of said link, means on said lever engageable with the link to limit the extent of pivotal link movement in one direction, an angularly movable arm having a cam engageable with said roller to rock the depending link into operative engagement with said lever and release the spring actuated door opening mechanism, said roller having a reduced portion and an enlarged portion whereby the cam will encounter the reduced portion during its return movement and quickly pass by the roller so that the link may again swing to its depending position.

5. An electric toaster comprising a pair of spaced heater elements, a bread carrier movable therebetween into and out of the toasting zone, a movable member engageable with said carrier to shift it out of the heating zone, resilient means tending to cause said movement, a horizontally disposed movable lever secured at one end to said member, rollers on said lever and laterally extending therefrom intermediate of its ends, a bracket having seats arranged to support said rollers and prevent said shifting movement, and a timing mechanism arranged to lift the rollers from their supporting seats whereby the carrier will be shifted out of the toasting zone.

6. In a toaster having a movable bread carrier, a time control mechanism including a depending pivotally supported member engageable with the carrier to shift it out of the heating zone, resilient tensioned means tending to cause said movement, a horizontal lever pivotally secured at one end to said member and controlling its movement, a transversely disposed roller intermediate of the ends of the lever, a bracket having a seat removably supporting said roller and including an abutment which restrains the lever and depending member from movement, and a clock mechanism having a swinging arm arranged to lift the other end of the lever after a predetermined toasting period and disengage the roller from said abutment whereby the lever is free to move longitudinally permitting a pivotal movement of the depending member which serves to quickly shift the bread carrier to an inoperative position.

7. In an automatic timing device for an electric toaster, a pivotally mounted door having a bread carrier thereon, a spring actuated door opening mechanism arranged to move the bread carrier out of the toasting zone, a horizontally disposed longitudinally movable lever pivotally secured at one end to a door opening member and journalled intermediate of its ends on a pair of coaxial laterally projecting rollers, a bracket having spaced supporting seats and substantially vertical shoulders adapted to removably position the lever against spring actuated longitudinal movement, a pair of spaced top faces on said bracket adapted to support the rollers and permit longitudinal lever movement during the opening and closing movement of the door, a clock mechanism having an escapement controlled angularly movable arm terminating in a cam, a depending link on the other end of the horizontal lever and having a roller journalled in the path of cam movement, and means limiting the extent of link movement relative to the lever whereby engagement of the cam and roller will serve to lift the rollers from the seats onto the said top faces permitting a longitudinal lever movement and causing the carrier to quickly shift out of the toasting zone.

8. In combination with an electric toaster having a bread carrier movable into and out of a toasting zone, a spring actuated member arranged to shift the carrier out of the toasting zone, a lever associated at one end with said member and arranged to release said member for spring actuated movement, a link on the free end of said lever and having a roller journalled at its lower end, a swinging arm provided with a cam arranged to engage said roller and shift said lever to release said spring actuated member, a timing mechanism arranged to cause an operative movement of said arm at a uniformly slow and predetermined rate, means to adjustably preset said arm relative to the roller, and a lost motion connection between said arm and the clock mechanism.

OSCAR M. ANDERSON.
NILS T. ALMQUIST.